(12) United States Patent  
Soika et al.

(10) Patent No.: US 8,655,424 B2  
(45) Date of Patent: Feb. 18, 2014

(54) SUPERCONDUCTIVE ELECTRIC CABLE

(75) Inventors: Rainer Soika, Hannover (DE); Frank Schmidt, Langenhagen (DE)

(73) Assignee: Nexans, Paris (FR)

( * ) Notice: Subject to any disclaimer, the term of this patent is extended or adjusted under 35 U.S.C. 154(b) by 174 days.

(21) Appl. No.: 13/146,697

(22) PCT Filed: Mar. 5, 2010

(86) PCT No.: PCT/EP2010/052813  
§ 371 (c)(1),  
(2), (4) Date: Nov. 3, 2011

(87) PCT Pub. No.: WO2010/108771  
PCT Pub. Date: Sep. 30, 2010

(65) Prior Publication Data  
US 2012/0040841 A1    Feb. 16, 2012

(30) Foreign Application Priority Data

Mar. 25, 2009   (EP) .................................. 09290218

(51) Int. Cl.  
    *H01L 39/14*   (2006.01)
(52) U.S. Cl.  
    USPC ........................................................ 505/231
(58) Field of Classification Search  
    USPC .................................. 505/230, 231; 428/930  
    See application file for complete search history.

(56) References Cited

U.S. PATENT DOCUMENTS

| 5,932,523 | A | 8/1999 | Fujikami et al. |
| 7,129,196 | B2 * | 10/2006 | Foltyn et al. ................. 505/237 |
| 2007/0235211 | A1 | 10/2007 | Soika et al. |

FOREIGN PATENT DOCUMENTS

| DE | 3928085 | * | 2/1991 |
| EP | 0650205 | * | 4/1995 |
| GB | 1421044 |   | 1/1976 |
| WO | 03052775 |   | 6/2003 |

OTHER PUBLICATIONS

International Search Report dated Jul. 9, 2010.  
International Search Report for PCT/EP2010/052813 dated Oct. 11, 2011.

* cited by examiner

*Primary Examiner* — Colleen Dunn  
(74) *Attorney, Agent, or Firm* — Sofer & Haroun, LLP

(57)  ABSTRACT

A superconductive electric cable is provided at least one superconductive conductor having strips or wires, which are wound in at least one layer around a carrier constructed as a pipe. The pipe is elastically deformable in a radial direction with changeable diameters and has a gap extending in a straight line along a circumferential line of the pipe over its entire length.

6 Claims, 1 Drawing Sheet

SUPERCONDUCTIVE ELECTRIC CABLE

RELATED APPLICATIONS

This application is a National Phase application of PCT/EP2010/052813, filed on Mar. 5, 2010, which in turn claims the benefit of priority from European Patent Application No, 09 290 218.8, filed on Mar. 25, 2009, the entirety of which. is incorporated herein by reference.

BACKGROUND

1. Field of the Invention

The invention relates to a superconductive electrical cable which includes at least one superconductive conductor composed of strips or wires that are wound around a support constructed as a pipe in at least one layer (WO 03/052775 A1).

2. Description of Related Art

In today's technology, a superconductive cable includes electrical conductors of a composite material which contains ceramic material which changes over into the superconductive state at sufficiently low temperatures. The electrical direct current resistance of an appropriately constructed conductor is zero when sufficiently cooled, as long as a certain current strength, the critical current strength is not exceeded. Suitable ceramic materials are, for example, oxidic materials on the basis of rare earths (ReBCO), particularly YBCO (yttrium-barium-copper oxide), or BSCCO (bismuth-strontium-calcium-copper oxide). Sufficiently low temperatures for bringing such a material into the superconducting state are, for example, between 67K and 110K. Suitable cooling agents are, for example, nitrogen, helium, neon or mixtures of these materials.

The known cable according to the above-mentioned WO 03/052775 A1 includes a superconductive conductor which is shaped in at least one layer around a pipe. The cable further. includes layers surrounding the conductor. It is arranged by leaving a free space in a cryostat composed of two metal pipes which are arranged coaxially relative to each other in between which a vacuum insulation is provided. A cooling agent for effecting the superconductive state of the conductor can be conducted through the pipe and through the free space of the cryostat.

The conductor of the superconductive cable is composed in today's technology of strips or wires of superconductive material which are wound in at least one layer around a support, for example, a pipe. By cooling the conductor as required. for operating the cable from room temperature to the temperature needed for the superconductive state, the superconductive conductor material shrinks by about 0.25% to 0.3%. In a cable length of, for example, 600 m, this may lead to a shortening of the conductor by about 1.5 m to 1.8 m, The superconductive cable and, thus, also its conductor is secured at its ends in connection fittings. The significant shortening of the conductor due to cooling leads to a substantial tensile load of the connect on fittings. In addition, it may easily lead to an overextension of the conductor or its individual elements and may lead to damage as a result which makes the conductor useless. For preventing such effects on the operability of the conductor, in accordance with EP 1 821 380 B1, its ends are to be fixed within the cryostat in a length which is shortened corresponding to the superconductive state only after cooling has taken place. This measure is relatively complicated. For example, when such a superconductive cable is heated, for example, for repair purposes to room temperature, the connecting fittings are additionally subjected to mechanical load due to the expanding cable.

OBJECTS AND SUMMARY

The invention is based on the object of constructing the above-described cable in such a way that length changes of the conductor caused by temperature changes can be compensated in a simple manner.

In accordance with the invention, this object is met in that the pipe is elastically deformable and is provided with a gap which extends in the axial direction of its entire length.

In this cable, the pipe used as the carrier of the conductor is elastically deformable in such a way that its diameter can be reduced by a radial pressure load acting from the outside. This is ensured by the gap extending in the longitudinal direction of the pipe and, wherein the gap is dimensioned with a sufficient width at room temperature, so that it can become narrower or at a maximum even close during cooling of the conductor. Consequently, the shortening of the conductor occurring during cooling has an effect essentially in the radial direction on its carrier, so that no substantial tensile loads can be exerted to the connecting fittings at the end of the cable. Since the pipe is elastically deformable, the gap once again widens when the radial load on the pipe is reduced or, in the extreme case, is eliminated, so that the diameter of the pipe becomes larger again. The conductor of the superconductive cable is independent of its length during cooling or heating continuously in contact with the surface of the pipe which as a result continuously acts as a support. The words "elastically deformable" mean in the sense of the invention that the pipe continuously presses against the conductor surrounding the pipe, i.e., has resilient properties in the widest sense.

The width of the gap which is necessary for the pipe acting in the above-described. manner, can be computed or given in dependence on the diameter of the pipe, the material of the pipe, and the difference between room temperature and work temperature of the cable in the superconductive state.

BRIEF DESCRIPTION OF THE DRAWINGS

Embodiments of the subject matter of the invention are illustrated in the drawings. In the drawing.

DETAILED DESCRIPTION

Figure 1:
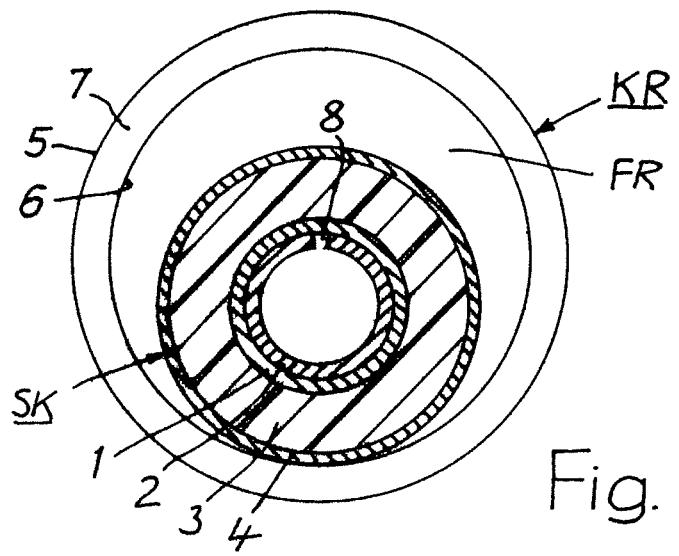
FIG. 1 is a cross sectional view of an arrangement with a superconductive cable.
Figure 2:
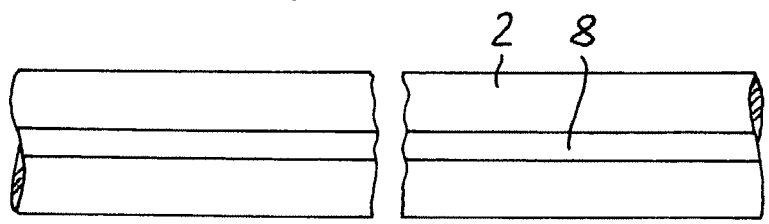
FIG. 2 shows a superconductive cable useable according to the invention as a carrier for the conductor of the cable.

In FIG. 1, the principle configuration of a cable SK arranged in a cryostat KR is illustrated. The cable SK includes a superconductive conductor 1 which is shaped around a pipe 2 constructed as a carrier. The conductor 1 is surrounded by a dielectric 3 above which is mounted a superconductive screen 4. The cryostat KR is composed of two metal pipes 5 and 6 arranged coaxially relative to each other, between which a vacuum insulation 7 is provided. The cryostat KR surrounds the cable as K and a free space FR for conducting a cooling agent therethrough.

The pipes 5 and 6 of the cryostat KR are advantageously of high-grade steel. They can be corrugated transversely of their longitudinal direction. Conductor 1 and screen 4 may be of conventional superconductive materials, particularly of the above-mentioned materials YBCO and BSCCO. The conductor 1 is advantageously made of superconductive strips or wires which are wound in at least one layer around pipe 2. The dielectric 3 is constructed according to conventional technology. The cable SK is in the embodiment according to FIG. 1 a superconductive cable with cold dielectric.

Figure 4:
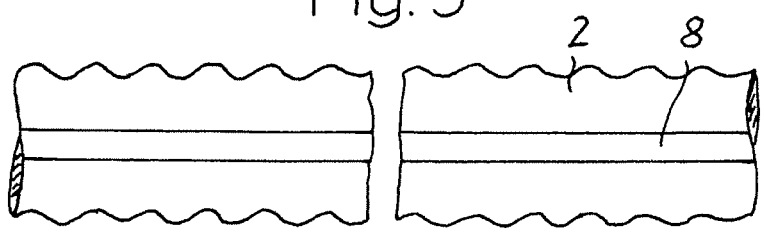

The pipe used as the carrier for the conductor 1 is elastically deformable in the sense described above, particularly in radial direction with changeable diameters. The pipe 2 is composed in the preferred embodiment of high-grade steel, copper or aluminum, or their alloys. It may advantageously be composed of a beryllium-copper alloy. In accordance with FIG. 4 it may be corrugated transversely of its longitudinal direction.

Figure 3:
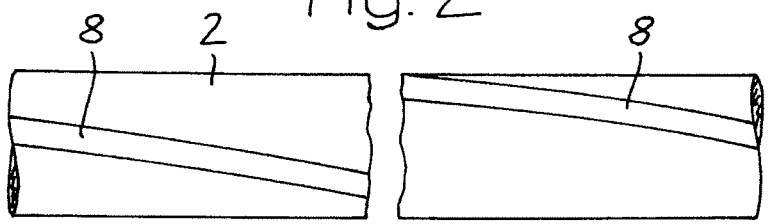
FIGS. 3 and 4 show embodiments of the pipe which are modified as compared to FIG. 2.

The pipe 2 has a gap 8 extending over its entire length in a straight line along a peripheral line of the pipe. In accordance with FIG. 3, the gap 8 can also extend helically with a preferably high angle of inclination.

EXAMPLE

The width of the gap 8 can be computed, for example, as follows: When a conductor having a pitch length LS is formed into a rope having the diameter D, the conductor length L per pitch length LS, is provided by the equation $L=\sqrt{(LS^2+\pi^2 D^2)}$. When the conductor is cooled, it becomes especially shorter by shrinkage. This shrinkage can be compensated by facilitating a reduction of the diameter composed of the wound conductor. This is achieved when for the length LK of the cold conductor the following applies: $LK=\alpha L$. In this connection, a is a factor that depends on the thermal confraction of the material of the strand. Metal materials shrink, for example, by about 0.3% when they are cooled from room temperature to 77K. In such a case, $\alpha=1-0.003=0.997$. It follows from the above indicated equation that for $L=\sqrt{(LS^2+\pi^2 D^2)}\times\alpha=\sqrt{(L^2+\pi^2 DK^2)}$ a diameter DK can be determined onto which the wound conductor of the shrunken conductor can be shrunk in the cold state.

In the superconductive cable SK, for example, the conductor is to be wound around a pipe 2 composed of high-grade steel having a diameter of 25 mm. The pitch length LS is supposed to have ten times the diameter. With a factor $\alpha$ of 0.997, such a diameter then corresponds to the circumference of the pipe 2 of 77.22 m. In the original state, the circumference of the pipe was the diameter if the pipe 2 is also shrunk radially by 0.3%, then the diameter of the pipe in the cooled state is 25 mm×0.997=24.93 mm. The circumference of the latter thus is 78.30 mm. For this example, the computation of the width of the gap 8 results in 78.30 mm−77.22 mm=1.08 mm. The material being used in the pipe 2 is ideally configured in such a way that, when the gap 8 is narrowed as a result of shrinkage or only a very slight plastic deformation takes place. This can be achieved by a suitable selection of the materials with appropriate wall thicknesses.

The invention claimed is:

1. Superconductive electric cable comprising:
    at least one superconductive conductor having strips or wires, which are wound in at least one layer around a carrier constructed as a pipe,
    wherein the pipe is elastically deformable in a radial direction with changeable diameters and has a gap extending in a straight line along a circumferential line of the pipe over its entire length.

2. Cable according to claim 1, wherein the pipe is corrugated transversely of its longitudinal direction.

3. Cable according to claim 1, wherein the pipe is of high-grade steel.

4. Cable according to claim 1, wherein the pipe is of copper or a copper alloy.

5. Cable according to claim 4, wherein the pipe is composed of a beryllium-copper alloy.

6. Cable according to claim 1, wherein the pipe is of aluminum or an aluminum alloy.

\* \* \* \* \*